(12) United States Patent
Jia

(10) Patent No.: US 9,405,993 B2
(45) Date of Patent: Aug. 2, 2016

(54) METHOD AND SYSTEM FOR NEAR-DUPLICATE IMAGE SEARCHING

(71) Applicant: Alibaba Group Holding Limited, George Town (KY)

(72) Inventor: Menglei Jia, Hangzhou (CN)

(73) Assignee: Alibaba Group Holdings Limited (KY)

( * ) Notice: Subject to any disclaimer, the term of this patent is extended or adjusted under 35 U.S.C. 154(b) by 237 days.

(21) Appl. No.: 14/080,537

(22) Filed: Nov. 14, 2013

(65) Prior Publication Data

US 2014/0126813 A1 May 8, 2014

Related U.S. Application Data

(63) Continuation of application No. 12/802,815, filed on Jun. 14, 2010, now Pat. No. 8,611,649.

(30) Foreign Application Priority Data

Jun. 16, 2009 (CN) .......................... 2009 1 0146726

(51) Int. Cl.
  *G06K 9/00* (2006.01)
  *G06K 9/62* (2006.01)
  *G06K 9/46* (2006.01)
  *G06F 17/30* (2006.01)

(52) U.S. Cl.
  CPC .......... *G06K 9/4652* (2013.01); *G06F 17/3025* (2013.01); *G06K 9/6282* (2013.01)

(58) Field of Classification Search
  None
  See application file for complete search history.

(56) References Cited

U.S. PATENT DOCUMENTS

| | | | |
|---|---|---|---|
| 5,647,021 A | 7/1997 | Baird et al. | |
| 5,668,897 A | 9/1997 | Stolfo | |
| 5,983,224 A | 11/1999 | Singh et al. | |
| 6,285,995 B1 * | 9/2001 | Abdel-Mottaleb | G06F 17/3025 707/737 |
| 6,628,824 B1 | 9/2003 | Belanger | |
| 6,754,675 B2 * | 6/2004 | Abdel-Mottaleb | G06F 17/3025 |
| 6,961,463 B1 | 11/2005 | Loui et al. | |

(Continued)

FOREIGN PATENT DOCUMENTS

| | | |
|---|---|---|
| CN | 101290634 A | 10/2008 |
| JP | 2000090239 | 3/2000 |

(Continued)

OTHER PUBLICATIONS

Deng, Y.—"An efficient low-dimensional color indexing scheme for region-based image retrieval"—1999 IEEE, pp. 3017-3020.

*Primary Examiner* — Bernard Krasnic
(74) *Attorney, Agent, or Firm* — Van Pelt, Yi & James LLP

(57) ABSTRACT

Image processing includes dividing the plurality of images into a plurality of groups wherein images in the same group share the same main color; extracting a color feature vector (CFV) of each image in the plurality of groups; subdividing images in each of the plurality of groups into a plurality of subgroups using a clustering technique according to a distance between the CFVs of the images in the group to establish an image signature tree; searching among the plurality of subgroups for a result-subgroup having the same main color as the main color of a given image and containing an image whose CFV has the shortest distance from the CFV of the given image; comparing the CFV of the given image with the CFVs in the result group; and identifying a near-duplicate image from the result group that meets a preset near-duplicate image determining condition.

14 Claims, 8 Drawing Sheets

(56) References Cited

U.S. PATENT DOCUMENTS

| | | | |
|---|---|---|---|
| 6,996,280 B1 | 2/2006 | Matsukawa et al. | |
| 7,023,446 B1 | 4/2006 | Iwasaki | |
| 7,046,851 B2 | 5/2006 | Keaton et al. | |
| 7,072,074 B2 | 7/2006 | Kuwata et al. | |
| 7,158,987 B2 | 1/2007 | Endo et al. | |
| 7,212,667 B1* | 5/2007 | Shin | G06F 17/3025 348/E5.108 |
| 7,245,762 B2* | 7/2007 | Shin | G06F 17/3025 348/E5.108 |
| 7,248,782 B2* | 7/2007 | Kasutani | G06F 17/30814 382/305 |
| 7,457,825 B2 | 11/2008 | Li et al. | |
| 7,634,472 B2 | 12/2009 | Thrall | |
| 7,647,331 B2* | 1/2010 | Li | G06F 17/30864 382/205 |
| 2002/0087538 A1* | 7/2002 | Abdel-Mottaleb | G06F 17/3025 |
| 2006/0218192 A1 | 9/2006 | Gopalakrishnan | |
| 2006/0253491 A1* | 11/2006 | Gokturk | G06F 17/30256 |
| 2007/0030364 A1 | 2/2007 | Obrador et al. | |
| 2007/0127813 A1 | 6/2007 | Shah | |
| 2007/0239756 A1* | 10/2007 | Li | G06F 17/30864 |
| 2008/0037877 A1* | 2/2008 | Jia | G06K 9/4671 382/224 |
| 2008/0082426 A1 | 4/2008 | Gokturk et al. | |
| 2008/0263042 A1* | 10/2008 | Li | G06F 17/3025 |
| 2009/0135292 A1 | 5/2009 | Muramatsu | |
| 2009/0147929 A1 | 6/2009 | Zhao et al. | |
| 2009/0161962 A1* | 6/2009 | Gallagher | G06F 17/30247 382/203 |
| 2009/0297050 A1* | 12/2009 | Li | G06K 9/622 382/225 |
| 2010/0128058 A1* | 5/2010 | Kawabata | G06F 17/30274 345/593 |

FOREIGN PATENT DOCUMENTS

| | | | |
|---|---|---|---|
| JP | 2001160070 | 6/2001 | |
| JP | 2004078995 A * | 3/2004 | G06T 7/00 |
| JP | 2004341940 | 12/2004 | |
| JP | WO 2008117526 A1 * | 10/2008 | G06F 17/30274 |
| WO | 9967695 | 12/1999 | |
| WO | 2007004477 | 1/2007 | |

* cited by examiner

METHOD AND SYSTEM FOR NEAR-DUPLICATE IMAGE SEARCHING

CROSS REFERENCE TO OTHER APPLICATIONS

This application is a continuation of co-pending U.S. patent application Ser. No. 12/802,815, entitled METHOD AND SYSTEM FOR NEAR-DUPLICATE IMAGE SEARCHING filed Jun. 14, 2010 which is incorporated herein by reference for all purposes, which claims priority to People's Republic of China Patent Application No. 200910146726.5 entitled METHOD AND APPARATUS OF SEARCHING FOR NEAR-DUPLICATED PICTURES USING COMPUTERS filed Jun. 16, 2009 which is incorporated herein by reference for all purposes.

FIELD OF THE INVENTION

The application relates to the field of digital image processing, and in particular to a method and system for searching near-identical images.

BACKGROUND OF THE INVENTION

Advancement in information technology is causing higher demand for searching for images. Sometimes, searching for near-duplicate images is necessary. Near-duplicate image detection requires the matching of slightly altered images to the original. For example, a sign or a watermark of a small area of an image which is introduced manually, or a picture zoom can cause one image to be a near-duplicate image to an original image.

Much effort has been devoted to visual applications that require effective image signature and similar metrics. Conventionally, an image extraction method for duplicate images detection includes two steps: first, certain features of two images are extracted and the features are called "signatures" of the images; then, the signatures of the two images are compared. If the signatures exactly match each other, the two images are determined to be the same. Color histogram vectors of the images are often used to represent the features of these images. And the vectors can be extracted by first selecting and qualifying a color space, such as a Red-Green-Blue (RGB) space, then calculating the number of pixels corresponding to each color within the whole or partial area of the image in order to form a color histogram, and constructing vectors using all the formed color histograms as signatures of the images. Therefore, one can use the above image extraction techniques to search for one particular image from a plurality of images.

To find an identical image of a given image from a plurality of images, comparison of the given image with each of the plurality images is often required. Because image feature extraction processes involved in the comparing process are complicated, searching efficiency is relatively low. Moreover, the conventional image feature extraction method typically cannot be used to determine whether two images are near-duplicate images because features of images may be changed with slight changes in the color of a partial area of the images. For example, a watermark embedded in an image may cause a slight color change in a small portion of the image, but it may cause a big change in the color histogram of the image.

Therefore, an efficient near-duplicate image search technique is needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer-readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time, or a specific component that is manufactured to perform the task. As used herein, the term "processor" refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

The present application provides a method and system for efficiently searching for near-duplicate images.

Figure 1:
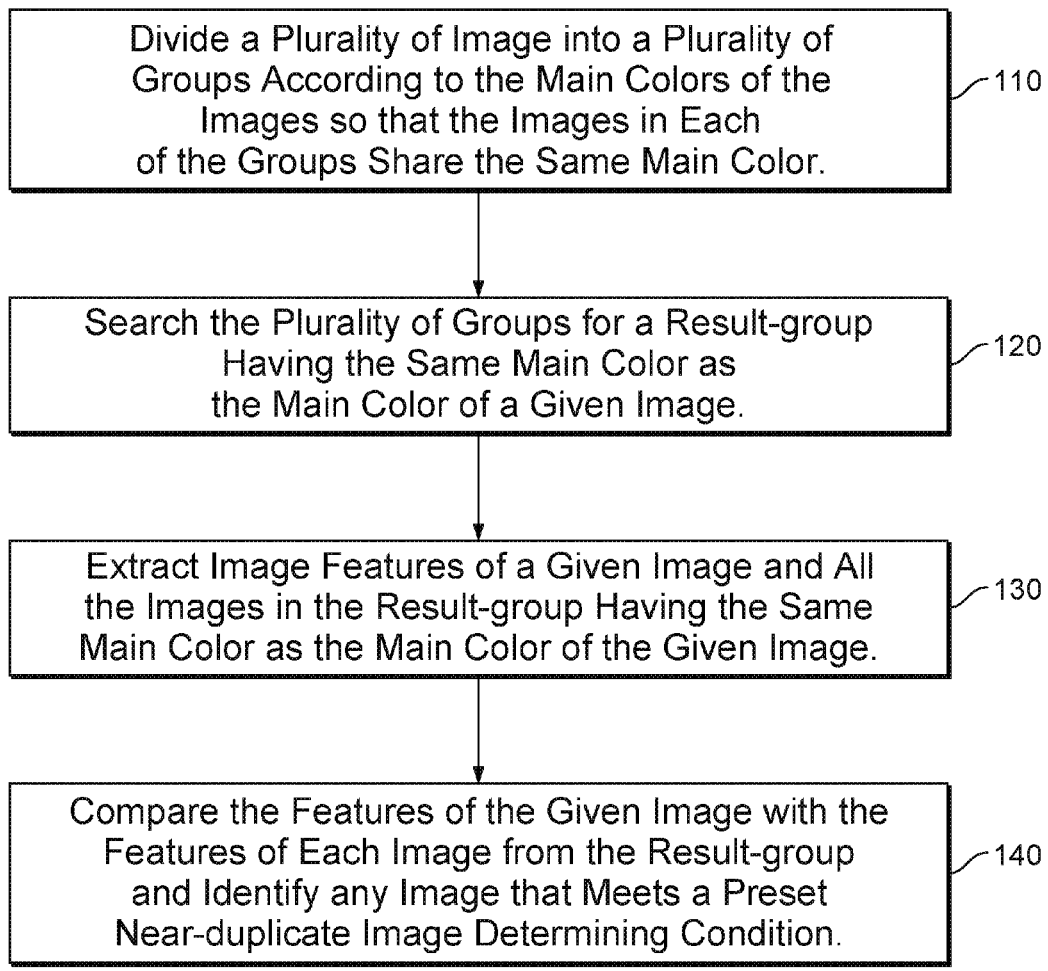
FIG. 1 is a flowchart illustrating an embodiment of a near-duplicate image searching method.

FIG. 1 is a flowchart illustrating an embodiment of a near-duplicate image searching process.

At 110, a plurality of images is divided into a plurality of groups according to the main colors of the images so that the images in each of the groups share the same main color.

As used herein, a color space refers to an absolute color space, that is, the colors are unambiguous where the interpretations of colors in the space are colormetrically defined without reference to external factors. A color model is a mathematical model describing the way colors can be represented as tuples of numbers, typically as three or four components (e.g. RGB and CMYK are color models). Adding a mapping function between the color model and a certain reference color space results in a definite "footprint" within the reference color space. In a three-dimensional color space, the three-dimensional coordinate axes correspond to three independent color parameters so that each color has a corresponding space position, and vice versa, any point in the space represents a specific color. For instance, when colors are displayed on a computer monitor, they are usually defined in the RGB (red, green, blue) color space. This is another way of making nearly the same colors (limited by the reproduction medium, such as the phosphor (CRT) or filters and backlight (LCD), and red, green, blue can be considered as the X, Y, and Z axes. Another way of making the same colors is to use their Hue (X axis), their Saturation (Y axis), and their brightness Value (Z axis). This is called the HSV color space. Many color spaces can be represented as three-dimensional (X, Y, Z) values in this manner.

The main color of an image refers to a color that corresponds to the most pixels in this image. In some embodiments, determining the main color of an image includes: selecting a color space, such as an RGB color space, and quantifying the color space into M number of colors, calculating the number of pixels corresponding to each color in the image; and selecting a color corresponding to the most number of pixels as the main color. Here, M is an integer greater than 1, such as 256, 512, 1024, etc.

At 120, a search is conducted among the plurality of groups for a result group having the same main color as that of a given image.

At 130, the image features of the given image and all the images in the result group are extracted.

At 140, the image features of the given image is compared with the image features of each image in the result group as that of the given image, and any image that meets a preset near-duplicate image determining condition is identified as a near-duplicate image of the given image.

The features of an image refer to information describing the characteristics of the image content. An image may have more than one image features, for example, a main color ratio (MCR), a color feature vector, etc.

The MCR of an image can be determined by initially quantifying the selected color space into M number of colors, where M is an integer larger than 1, and then calculating the number of pixels corresponding to each color in the image, followed by finding the color which has highest number of pixels, denoting the highest pixel number as H, summing the total number of pixels in the image denoted as T, and calculating the ratio between H and T. Therefore, MCR is equal to H divided by T.

A color feature vector (CFV) is another way to represent the features of an image. Each element of the CFV corresponds to one color in the color space of the image. In some embodiments, the CFV of an image can be determined by first dividing the image into N blocks, and calculating the number of pixels corresponding to each of a predetermined set of colors in every block, and then constructing a vector where its elements correspond to the number of pixels for a predetermined set of colors. Here, N is an integer larger than 1, such as 4, 9, and 16. The predetermined set of colors is greater than or equal to 1, but less or equal to M aforementioned. For instance, red, yellow, and blue can be selected as a tricolor set, or any subset of the M number of colors obtained from the aforementioned can be selected.

In some other embodiments, the CFV of an image can be determined by directly calculating the number of pixels corresponding to each of the predetermined set of colors in the image, then constructing a vector where its elements correspond to the number of pixels for a predetermined set of colors.

In some embodiments, a near-duplicate image determining condition is set as the following: (1) the distance between the CFVs of two images is zero; and (2) the difference of the MCRs of two images is lower than a preset threshold, such as a value between 0 and 1.

In some other embodiments, a near-duplicate image determining condition is set as the following: (1) the distance between the CFV of two images is lower than a preset threshold; and (2) the difference of the MCR of a first color of two images is lower than a first preset threshold, and the difference of the MCR of a second color of two images is lower than a second preset threshold. In some embodiments, the values of both thresholds are between 0 and 1, and the first threshold's value is higher than the second threshold's value.

Figure 2:
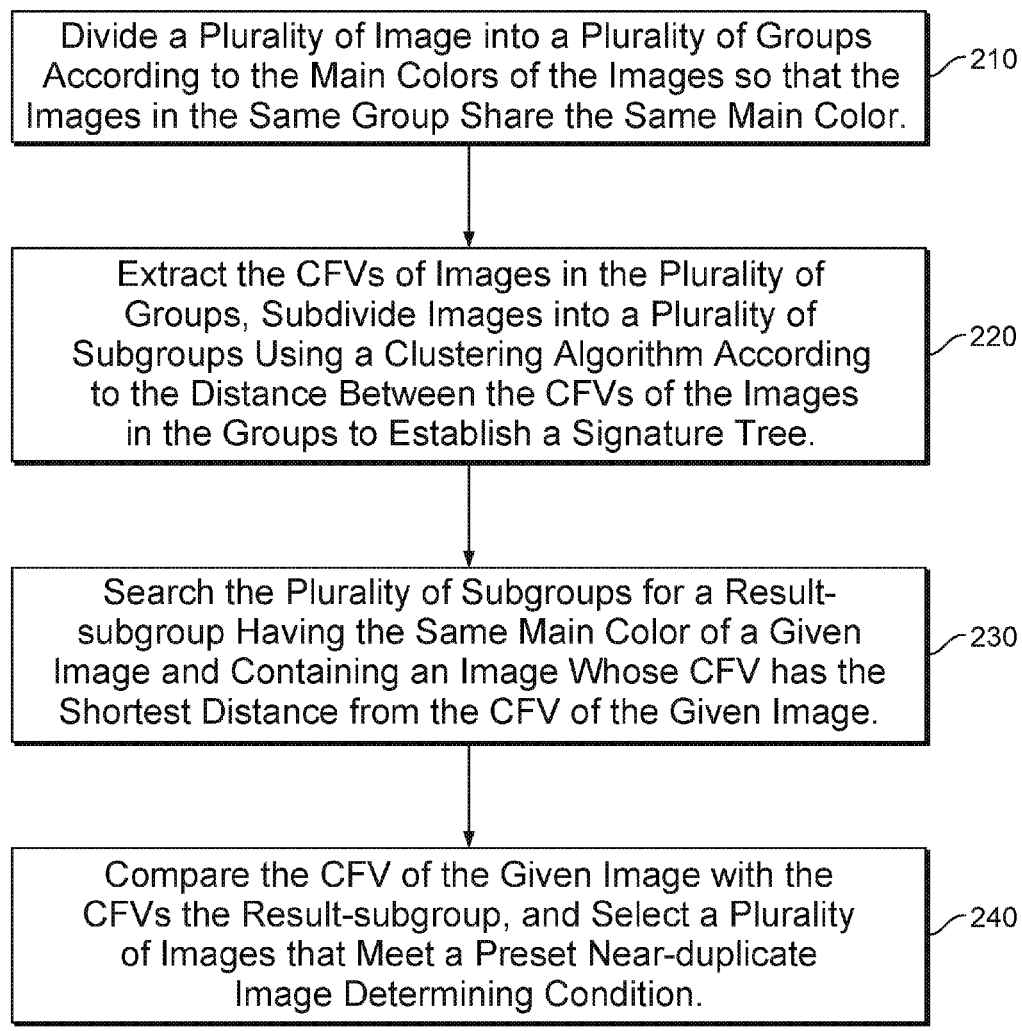
FIG. 2 is a flowchart illustrating another embodiment of a near-duplicate image searching method.

FIG. 2 is a flowchart illustrating another embodiment of a near-duplicate image searching process.

At 210, a plurality of images is divided into a plurality of groups according to the main colors of the images so that the images in each of the groups share the same main color.

At 220, the CFV of each image in the plurality of groups is extracted, and the images in a group are subdivided into a plurality of subgroups using a clustering technique according to the distance between the CFVs of the images in the groups to establish a signature tree.

In some embodiment, the clustering technique used is k-means clustering, which is a method of cluster analysis that aims to partition N observation into K clusters in which each observation belongs to the cluster with the nearest means. That is the clustering technique is used to divide multiple elements of the same type into groups. It is similar to the expectation-maximization technique for mixtures of Gaussians in that they both attempt to find the centers of natural cluster in the data as well as in the iterative refinement approach employed by both techniques. This technique is commonly used in computer vision as a form of image segmentation. The results of the segmentation are used to aid border detection and object recognition. Here, N and K are both positive integers. For example, an image group contains N images and it can be divided into K subgroups according to an initial criterion, with each subgroup containing at least one image and each image belonging to a single group. Then, an iterative method is used to further divide a previous subgroup so that the current grouping result is better than the previous grouping result (i.e., the distance between the images in one group is increasingly shorter and the distance between the images from different groups is increasingly longer.) In the present application, the clustering technique is used to divide the CFVs of a plurality of images into groups. For instance, A (a1, b1, c1) and B(a2, b2, c2) are two CFVs and D is the distance between the vectors A and B, then $D=\text{sqrt}((a1-a2)^2+(b1-b2)^2+(c1-c2)^2)$.

The k-means clustering can be implemented in the following process to establish a signature tree:

First, a group, group A, is selected, and the main color of the group is set as the root node of a signature tree and the root node is set as the parent node of subtrees.

Second, the CFVs of the images in group A are divided into K subgroups using a clustering technique according to the distance between the images' CFVs. Here, K is an integer that is greater than 1. If any of the K subgroups does not meet a predetermined grouping stop condition, the clustering center of the respective CFVs of this subgroup is set as a child node of the current parent node and this subgroup is set as the current image group; then set the child node as the current parent node. This step is performed recursively.

In some embodiments, the clustering center of the groups is a CFV (CFV-center) determined from all the CFVs in the group. The distance between the CFV-center and each CFV in the subgroup is less than the distance between any CFV in other subgroups and each CFV in this subgroup.

A plurality of grouping stop conditions can be used. In some embodiments, the grouping stop condition refers to that the total number of CFVs in the group is lower than a preset threshold. The preset threshold is an integer greater than 1. In some other embodiments, the grouping stop condition means that the distances between each CFV in the group and the CFVs' clustering center of the group is lower than a preset threshold. The threshold is a natural number. In other embodiments, the grouping stop condition can be set as that the number of divisions of a group exceeds a threshold, which is an integer greater than 1. The number of divisions of a group refers to the number of division performed for obtaining the subgroup from the initial image group A.

Third, in the event that any of the K subgroups meets the predetermined grouping stop condition, the image corresponding to each of the CFVs in the K subgroups is set as a child node of the current parent node, and this child node represents a group that is obtained from subdividing the images in group A into K subgroups using the clustering technique in the second step.

At 230, a search is conducted among the plurality of subgroups for a result-subgroup having the same main color as that of a given image and containing an image whose CFV has the shortest distance from the CFV of the given image.

In some embodiments, the search is carried out as the following: (1) searching the image signature tree established above for a subtree, in which the root node is the main color of the given image, and setting this subtree's root node as the current parent node; (2) searching the child nodes of the current parent node in the subtree, and in the event that the child node found is an intermediate node, proceeding to the next step, in the event that the child node found is a leaf node, skipping the next step; (3) setting the intermediate node as the current parent node and returning to step (2) in the event that the distance between the CFV of the intermediate node and that of the given image meets a preset condition; otherwise, stopping the search; and (4) defining the subgroup represented by the leaf node as the group containing images whose main color is the same as that of the given image and whose CFV has the shortest distance from that of the given image.

In some embodiments, the preset condition mentioned above includes: (a) the distance between the CFV of the intermediate node and that of the given image is lower than a predetermined threshold, which is a natural number; and (b) the distance between the CFV of this intermediate node and that of the given image is the minimum value among the distances between the CFVs of all the intermediate nodes found and that of the given image. For example, if there are four intermediate nodes of the current parent node, and the distances between the CFVs of the four intermediate nodes and that of the given image are 1, 2, 3, and 4, respectively, then the intermediate node corresponding to the distance 1 is determined as the node meeting the preset condition.

At 240, the image feature of the given image is compared with the image feature of each image in the result-subgroup, and a plurality of images that meet a preset near-duplicate image determining condition is selected as the near-duplicate images of the given image. Here, the near-duplicate image determining condition is the same as that of FIG. 1.

Figure 3:
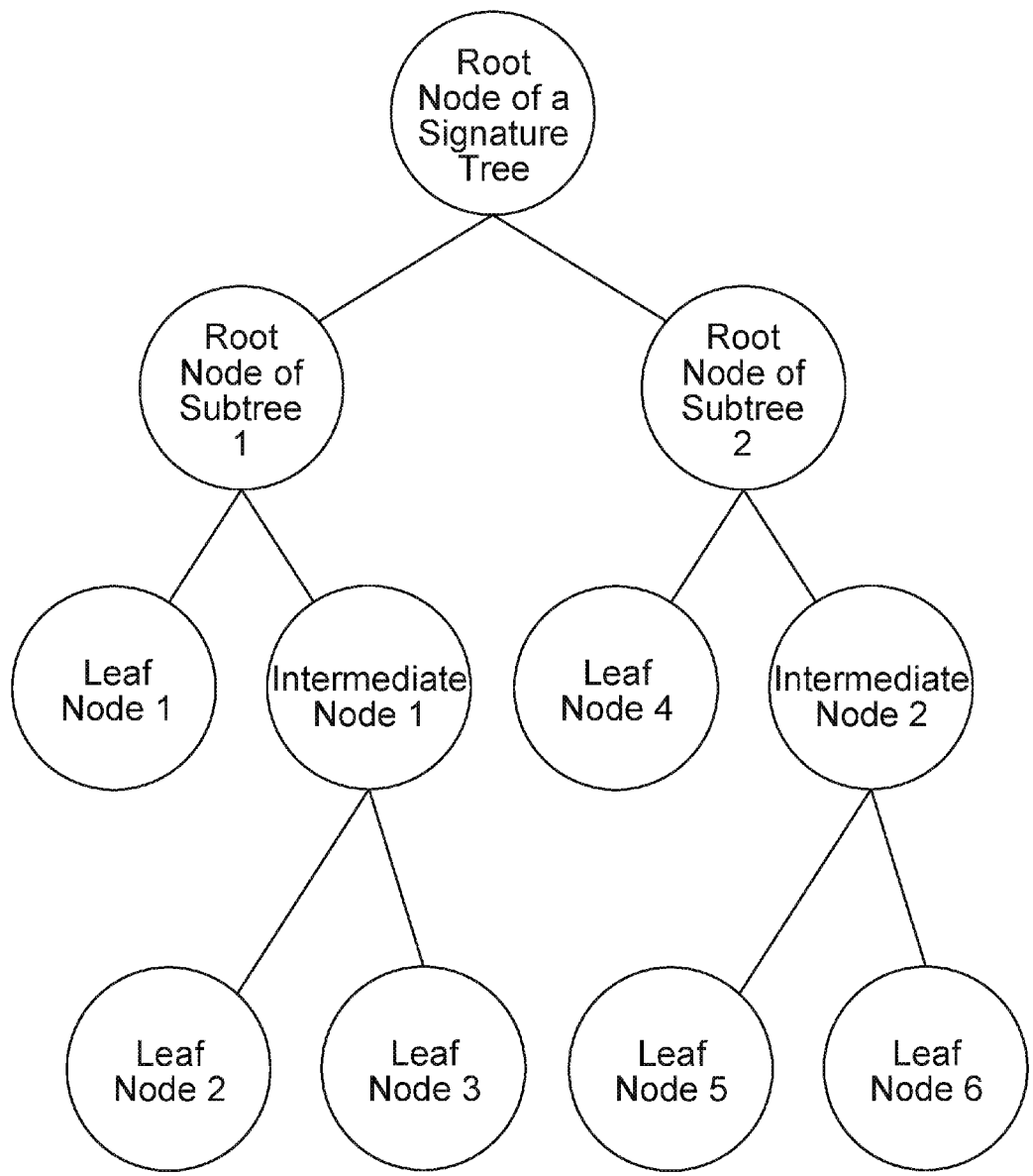
FIG. 3 is a schematic diagram of the structure of an image signature tree established in the embodiment of FIG. 2.

FIG. 3 is a schematic diagram of the structure of an image signature tree established in the embodiment of FIG. 2. In this example, an image group contains 10 images. The signature tree of this group is established by the following process:

1) set the root of the signature tree.

2) divide the images into 2 groups so that each group includes 5 images. The images' main color in the first group (G1) is determined to be red and the images' main color in the second group (G2) is determined to be blue. The CFV for each image in both groups is calculated.

3) set the main color of the images in the first group G1 as the root node of one subtree, subtree 1, of the signature tree; then set the root node of subtree 1 as the current parent node; and further divide images in the subtree 1 into 2 subgroups (G11 and G12) using the clustering technique according to the CFV distances between images. As the result of the further division, a first subgroup (G11) includes the CFVs of 2 images and a second subgroup (G12) includes the CFVs of 3 images.

4) set the MCRs and the CFVs of the 2 images in the first group (G11) as a child node (leaf node 1) of the current parent node (root node of subtree 1) since the preset grouping stop condition is met, i.e., the number of vectors in a group is less than 3; and set the clustering center of the 3 CFVs in the second group (G12) as another child node (intermediate node 1) of the current parent node (root node of subtree 1) since the preset stop grouping stop condition is not met; then set intermediate node 1 as the current parent node.

5) further divide the CFVs of the 3 images in the G12 into 2 subgroups using the clustering technique according to the distances between the CFVs of the images in G12 so that a first subgroup of G12 (G121) from the division includes the CFV of 1 image and a second subgroup of G12 (G122) from the division includes the CFVs of 2 images.

6) set the MRC and the CFV of the one image in G121 as a child node (leaf node 2) of the current parent node (intermediate node 1) and set the MRCs and CFVs of the two images in G122 as another child node (leaf node 3) of the current parent node (intermediate node 1) since both G121 and G122 meet the preset grouping stop condition, i.e., the number of vectors is less than 3 in each group.

7) set the main color of the image in G2 as the root node of a subtree, subtree 2, of the signature tree; then set this root node of subtree 2 as the current parent node; and further divide the images in subtree 1 into 2 subgroups (G21 and G22) using the clustering technique according to the CFV distances between images. As the result of the further division, a first subgroup (G21) includes the CFV of 1 image and a second subgroup (G22) includes CFVs of 4 images.

8) set the MCR and the CFV of the one images in the first group (G21) as a child node (leaf node 4) of the current parent node (root node of subtree 2) since the preset grouping stop condition, i.e., the number of vectors in a group is less than 3, is met; and set the clustering center of the 4 CFVs in the second group (G22) as another child node (intermediate node 2) of the current parent node (root node of subtree 2) since the preset stop grouping stop condition is not met; then set intermediate node 2 as the current parent node.

9) further divide the CFVs of the 4 images in the group G22 into 2 subgroups using the clustering technique according to the distances between the CFVs of the images in G22 so that a first subgroup of G22 (G221) from the division includes the CFV of 2 images and a second subgroup of G22 (G222) from the division includes the CFVs of another 2 images.

10) set the MRCs and the CFVs of the two images in G221 as a child node (leaf node 5) of the current parent node (intermediate node 2) and set the MRCs and CFVs of the two images in G222 as another child node (leaf node 6) of the current parent node (intermediate node 2) since both G221 and G222 meet the preset grouping stop condition, i.e., the number of vectors is less than 3 in each group.

The image signature tree for ten images is thus established in FIG. 3. Because the image signature tree includes six leaf nodes, the 10 images are divided into six groups.

After the image signature tree is built as shown in FIG. 3, the following process can be used to search a near duplicate-image for a given image, which has "red" as its main color:

1) search the image signature tree for a subtree whose root node has "red" main color and set this root node as the current parent node (root node of subtree 1) of the "red" subtree found.

2) search the child nodes of the current parent node (root node of subtree 1). Two child nodes are found: leaf node 1 and intermediate node 1.

3) compare the image features of leaf node 1 with those of the given image. The comparison result shows that the distance between the CFV of the given picture and the CFV of leaf node is 0 and the difference between the MCR of the given image and the MCR of the leaf node 1 is lower than a preset MCR threshold. Thus, leaf node 1 is selected as the near-duplicate image of the given image; and 4) calculate the distance between the CFV of intermediate node 1 and the CFV of the given image. The result shows that the distance exceeds a preset threshold and thus does not meet the preset condition.

Figure 4:
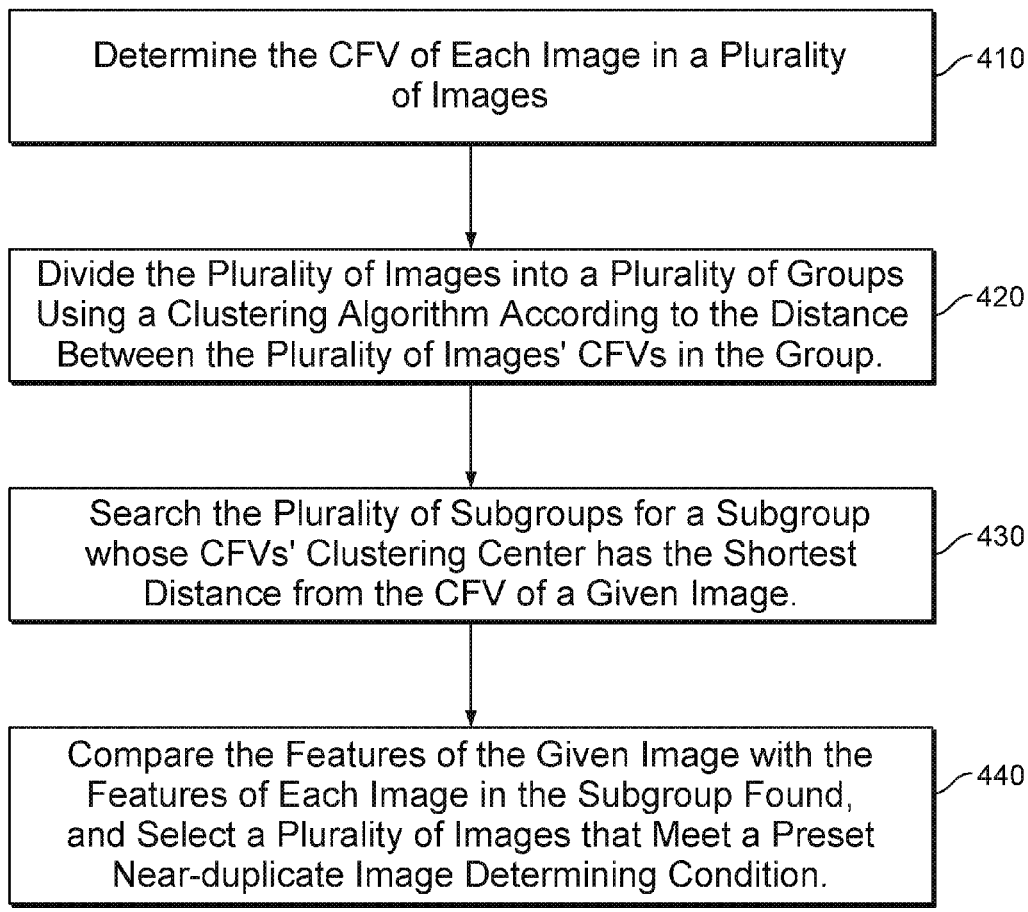
FIG. 4 is a flowchart illustrating another embodiment of a near-duplicate image searching method.

FIG. 4 is a flowchart illustrating another embodiment of a near-duplicate image searching method.

At 410, the CFV of each image in a plurality of images is determined.

At 420, the plurality of images is divided into a plurality of groups using a clustering technique according to the distance of the plurality of the images' CFVs.

In some embodiments, the clustering technique is similar to the k-means clustering technique at 220 of FIG. 2.

At 430, a search is conducted among the plurality of subgroups for a result-subgroup whose CFVs' clustering center has the shortest distance from the CFV of a given image.

In some embodiments, the search is carried out as the following: (1) setting the root node of the signature tree built above as the current parent node; (2) searching the image signature tree for the child nodes of the current parent node; in the event that the child node found is an intermediate node, proceeding to the next step; in the event child node found is a leaf node, skipping the next step; (3) setting the intermediate node as the current parent node and returning to the last step if the distance between the CFV of the intermediate node and the CFV of the given image meets a preset condition; otherwise, stopping the search; and (4) selecting the subgroup represented by the leaf node as the group containing images whose CFV has the shortest distance from that of the given image. Here, the preset condition is the same as that of FIG. 2.

At 440, the image feature of the given image is compared with the image feature of each image in the result-subgroup; and a plurality of images that meets a preset near-duplicate image determining condition is selected as the near-duplicate images of the given image. Here, the preset near-duplicate image determining condition is the same as that in FIG. 2.

Example implementations of embodiments of systems for near-duplicate image searching are described below. Some systems are described to include a number of modules or units. The modules or units can be implemented as software components executing on one or more processors, or as hardware such as programmable logic devices and/or Application Specific Integrated Circuits designed to perform certain functions or combinations thereof. In some embodiments, the modules/units/subunits can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules or units may be implemented on a single device or distributed across multiple devices. The functions of the modules or units may be merged into one another or further split into multiple sub-modules or sub-units.

Figure 5:
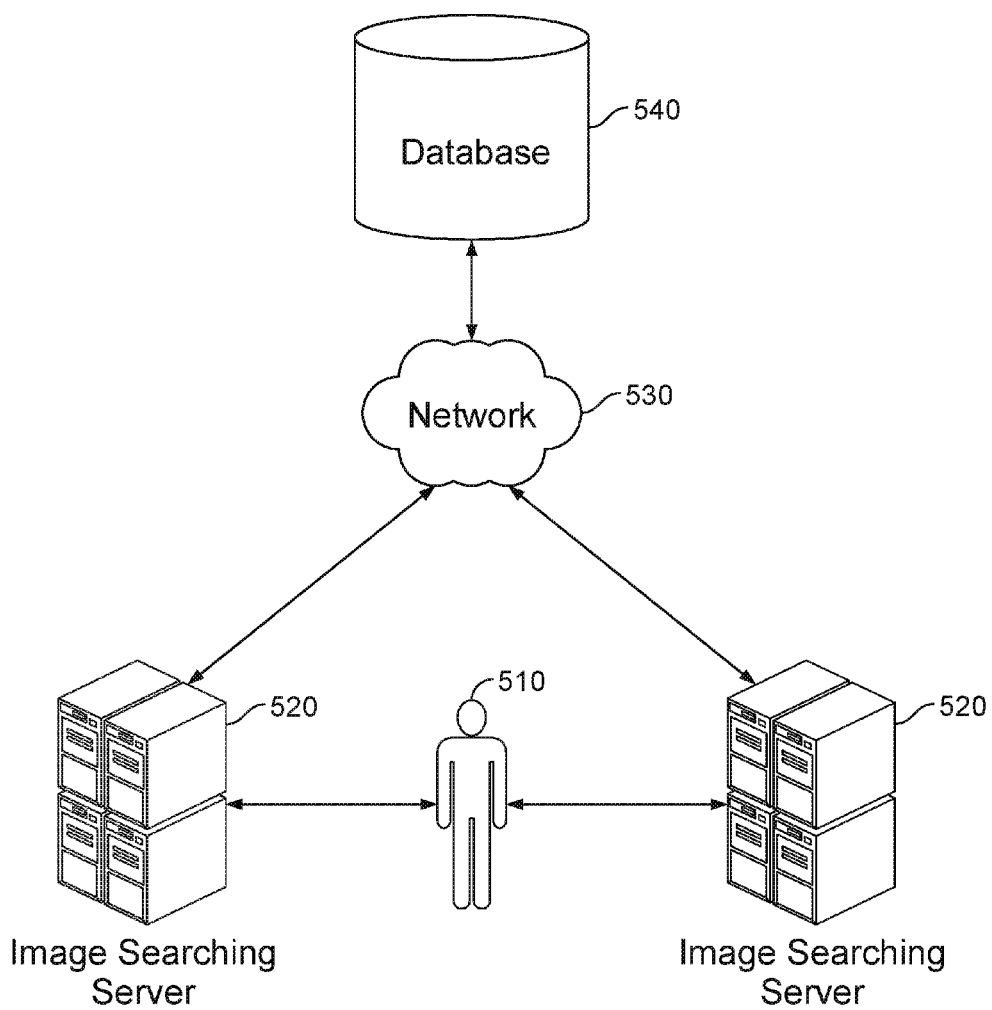
FIG. 5 is a schematic diagram illustrating an embodiment of a near-duplicate image searching system.

FIG. 5 is a schematic diagram illustrating an embodiment of a near-duplicate image searching system. In the example shown, a user 510 sends a given image, which may be uploaded by the user found over the Internet to a near-duplicate image searching server 520. The near-duplicate image searching server 520 then searches an image database 540 through a network 530 according to the embodiments illustrated in FIGS. 1-4. Finally, server 520 returns the searching result to the user 510. In some embodiments, calculating and comparing the CFVs and MCRs of the images are carried out in the memory of server 520. The CFVs and MCRs of the images may be stored in database tables of the image database 540 once they are calculated for each image. The signature tree built by the embodiments above may also be stored in the database.

Figure 6:
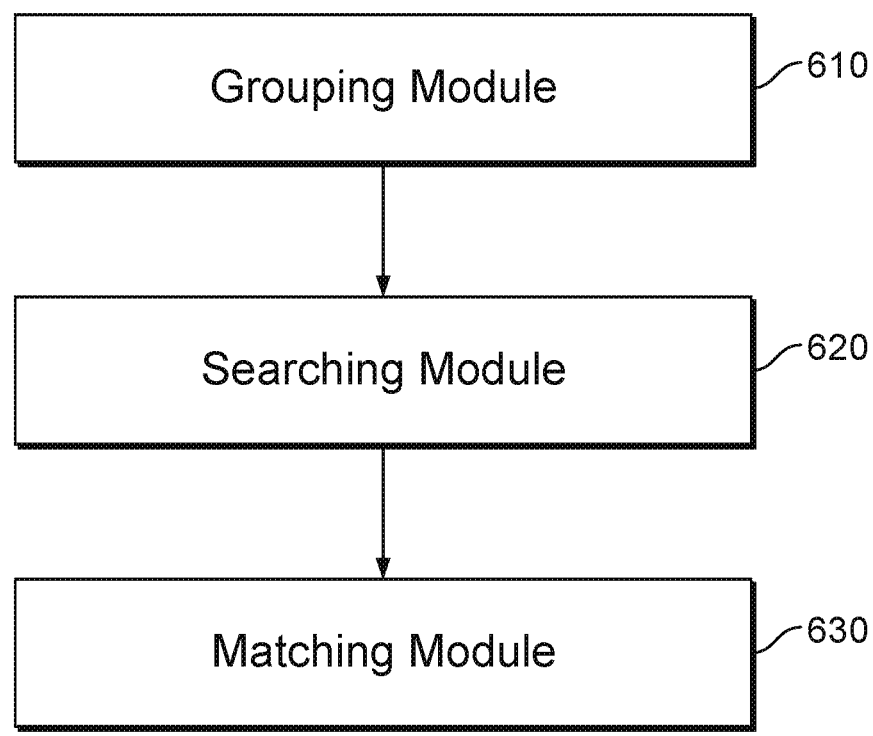
FIG. 6 is a block diagram illustrating an embodiment of a near-duplicate image searching system.

FIG. 6 is a block diagram illustrating an embodiment of a near-duplicate image searching system that may be used in accordance with an embodiment of the present invention. As shown, in some embodiments, a near-duplicate image searching server includes: a grouping module 610, which is adapted to divide a plurality of images into a plurality of groups with the images in any one of the groups sharing the same main color; a searching module 620, which is adapted to search the plurality of groups for a group containing images with a main color the same as that of a given image; and a matching module 630, which is adapted to compare the image features of the images in the group found by the searching module 620 with the image features of a given image and select an image which meets a preset near-duplicate image determining condition according to the comparison result as the near-duplicate image of the given image.

Figure 7:
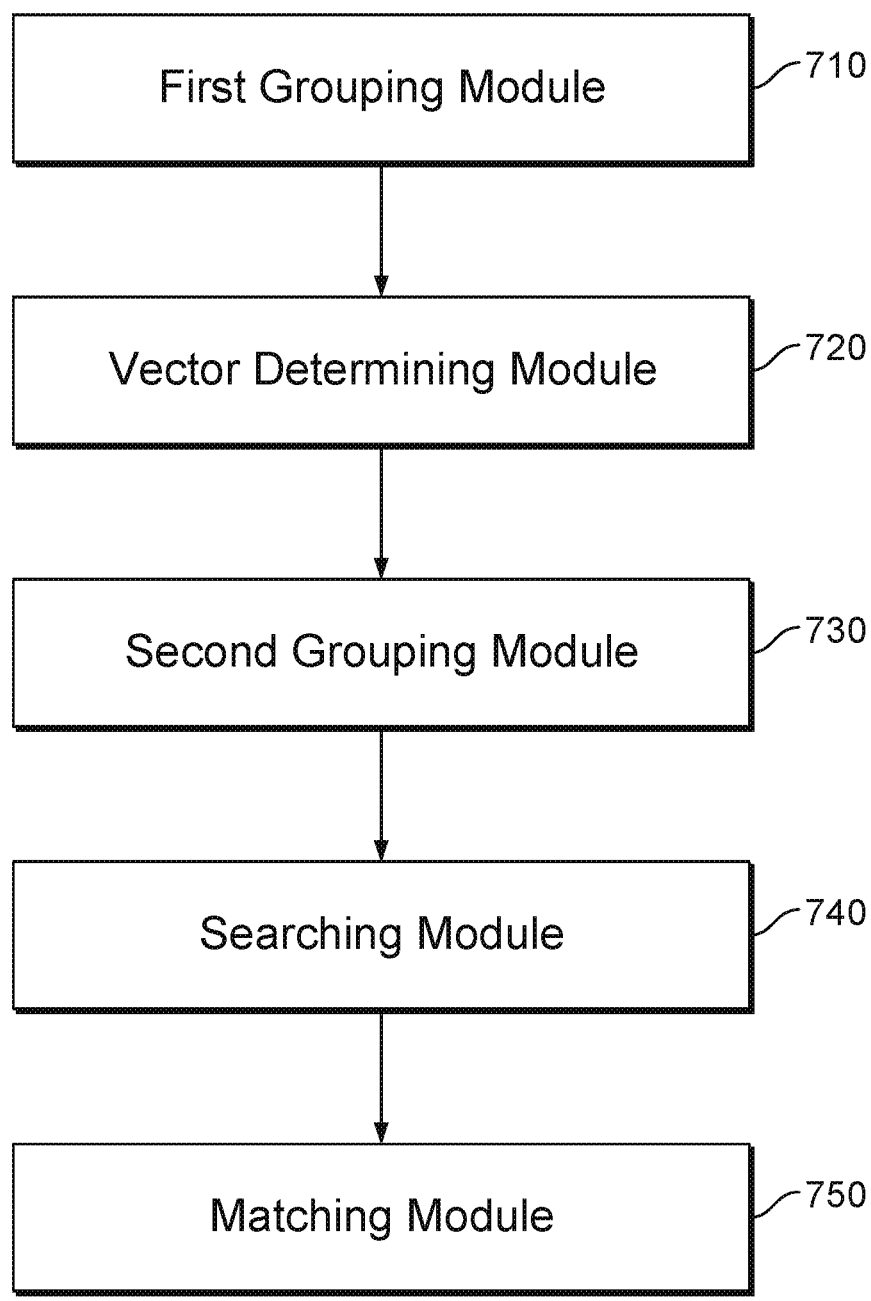
FIG. 7 is another block diagram illustrating an embodiment of a near-duplicate image searching system.

FIG. 7 is a block diagram illustrating an embodiment of a near-duplicate image searching system that may be used in accordance with an embodiment of the present invention. As shown, in some embodiments, a near-duplicate image searching server includes: a first grouping module 710, which is adapted to divide a plurality of images into a plurality of groups, with the images in any one of the groups sharing the same main color; a vector determining module 720, which is adapted to determine the CFVs of the images in each of the plurality of groups; a second grouping module 730, which is adapted to subdivide the images in each of the plurality of groups into a plurality of subgroups using a clustering technique, according to the distance between the CFVs of the images in the group; a searching module 740, which is adapted to search in the subgroups obtained from the subdivision by the second grouping module, for a subgroup containing an image whose main color is the same as the main color of the given image and whose CFV has the shortest distance from the CFV of the given image; and a matching module 750, which is adapted to compare the image features of the images in the subgroup found by the searching module

740 with the image features of the given image, and select images that meet the preset near-duplicate image determining condition according to the comparison result as the near-duplicate image of the given image.

The second grouping module 730 further includes: a sub-tree establishment unit, which is adapted to set each of the plurality of groups as the current image group and as a first subgroup, and set the main color of the images in the current image group as a root node of the subtree, and then set this root node as the current parent node; the sub-tree establishment unit trigger a clustering grouping unit; a clustering grouping unit, which is adapted to divide the CFVs of the images in the current image group into K subgroups using a clustering technique according to the distance between the CFVs of the images in the current image group, where K is a natural number; the clustering grouping unit triggers a recursion establishment unit; a recursion establishment unit, which is adapted to determine whether a member of the K subgroups meets a predetermined grouping stop condition; if so, it triggers a leaf node establishment unit, otherwise, it triggers an intermediate node establishment unit; an intermediate node establishment unit, which is adapted to set the clustering center of the CFVs in the subgroup as a child node of the current parent node, then set this subgroup as the current image group, and set the child node as the current parent node; it triggers the clustering grouping unit; and a leaf node establishment unit, which is adapted to set the images corresponding to the CFVs, which meet the predetermined grouping stop condition, in this subgroup as the child node of the current parent node, and select the subgroup corresponding to this child node as one of the plurality of subgroups (the first subgroup) that is obtained by using the clustering technique according to the distance between the CFVs in the first subgroup. The grouping stop condition here is the same as the embodiments described in connection with FIG. 2.

The searching unit 740 further includes: a first searching unit, which is adapted to search the image signature tree for a subtree in which the root node is the main color of the given image and set the root node of this subtree as the current parent node; a second searching unit, which is adapted to search the subtree for a child node of the current parent node; if the child node is an intermediate node, it triggers an intermediate node processing unit; and if the child node is a leaf node, it triggers a leaf node processing unit; the intermediate node processing unit, which is adapted to determine whether the distance between the center of the CFVs of the intermediate node and the CFV of the given image meets a preset condition, if so, it sets the intermediate node as the current parent node; otherwise, it stops the searching; and the leaf node processing unit, which is adapted to determine the subgroup containing the images of the leaf node as a subgroup in which the images' main color is the same as that of the given image and their CFVs have the shortest distance from that of the given image. Here, the preset conditions and the near-duplicate image determining conditions are the same as mentioned in FIG. 2.

Figure 8:
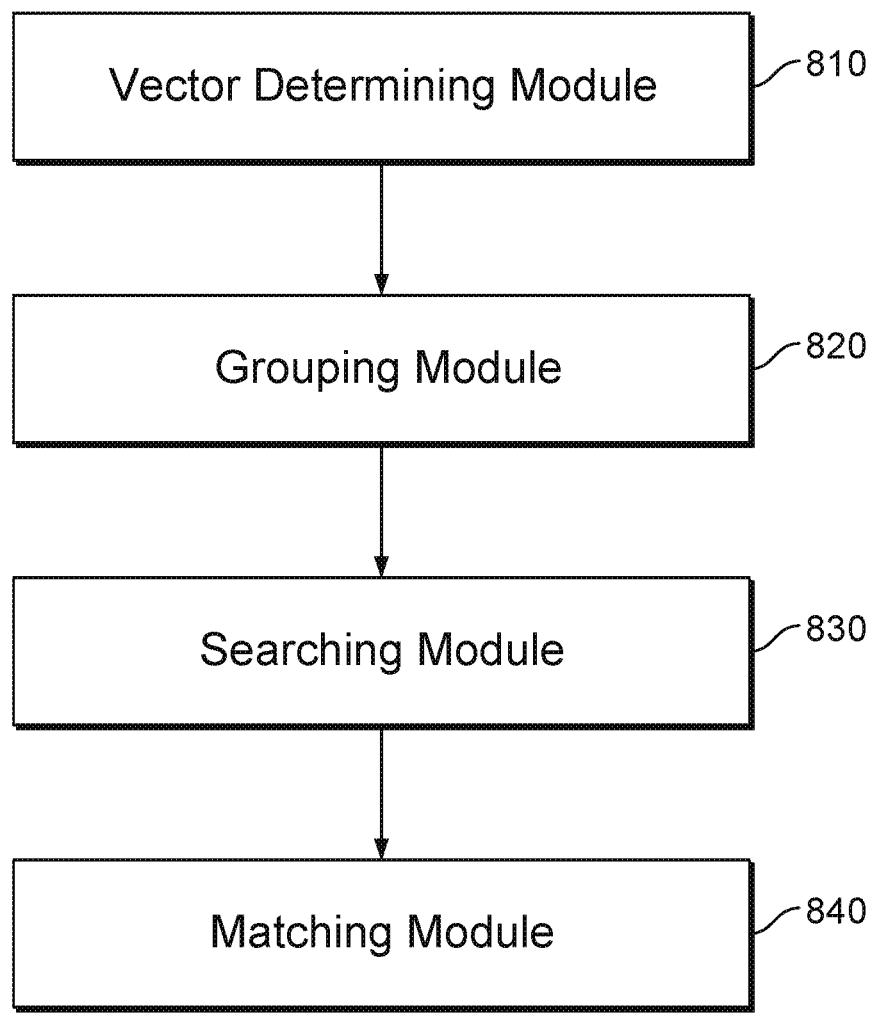
FIG. 8 is another block diagram illustrating an embodiment of a near-duplicate image searching system.

FIG. 8 is another block diagram illustrating an embodiment of a near-duplicate image searching system that may be used in accordance with an embodiment of the present invention. As shown, in some embodiments, a near-duplicate image searching server includes: a vector determining module 810, which is adapted to determine the CFV of each of a plurality of images to be grouped; a grouping module 820, which is adapted to divide the plurality of images into a plurality of groups using a clustering technique according to the distances between the CFVs of the plurality of images; a searching module 830, which is adapted to search the plurality of groups for a group which contains a plurality of images with their CFVs having the shortest distance from the CFV of the given image; and a matching module 840, which is adapted to compare the image features of images in the group found by the searching module 830 with the image features of the given image, and select a plurality of images that meets the preset near-duplicate image determining condition as the near-duplicate image of the given image according to the comparison result.

The grouping module 820 further includes: an initializing unit, which is adapted to set a root node of the image signature tree; it also sets the root node as the current parent node and the group containing a plurality of images as the current image group; a clustering grouping unit, which is adapted to divide the CFVs of the images in the current image group into K subgroups using the clustering technique according to the distance between the CFVs of the images in the current image group, where K is a natural number; a recursion establishment unit, which is adapted to determine whether each of the K subgroups meets a predetermined grouping stop condition; and, if so, it triggers a leaf node establishment unit, otherwise, it is also adapted to trigger an intermediate node establishment unit; an intermediate node establishment unit, which is adapted to set the clustering center of the CFVs in the subgroup as a child node of the current parent node, to set this group as the current image group, and to set the child node as the current parent node; it is also adapted to trigger the clustering grouping unit; and a leaf node establishment unit, which is adapted to set the images corresponding to the CFVs, which meet the predetermined grouping stop condition, in this subgroup as the child node of the current parent node, and select the subgroup corresponding to this child node as one of the plurality of subgroups (the first subgroup) that is obtained by using the clustering technique according to the distance between the CFVs of the plurality of images to be grouped. Examples of the grouping stop condition are mentioned above in connection with FIG. 2.

The searching module 830 further includes: a first searching unit, which is adapted to set the root node of the image signature tree as the current parent node, search the image signature tree for a child node of the current parent node, and trigger an intermediate node processing unit if the child node is an intermediate node and trigger a leaf node processing unit if the child node is a leaf node; an intermediate node processing unit, which is adapted to determine whether the distance between the CFVs of the intermediate node and the CFV of the given image meets a preset condition, and if so, set the intermediate node as the current parent node and trigger the first searching unit; otherwise, stop the searching; and the leaf node processing unit, which is adapted to determine the subgroup containing the images of the leaf node as a subgroup in which the images' CFVs have the shortest distance from that of the given image.

Examples of the preset conditions and the near-duplicate image determining conditions are described in connections with FIG. 2.

The embodiments of the present invention use grouping techniques to sub-divide the original image group into much smaller subgroups. Instead of comparing all the images in a big group to find near-duplicate images of a given image, only the images in a much smaller subgroup meeting a preset conditions need to be compared with the given image. Therefore, searching efficiency for near-duplicate images is much improved compared to the conventional searching methods.

For easy description, the above system is divided into, according to functions, various modules, which are described respectively. However, the function of each module may be implemented in one or more software and/or hardware during the practice of the present application.

One skilled in the art should understand that the embodiments of this application may be provided as a method, a system, or a computer product. Therefore, this application may be in the form of full hardware embodiments, full software embodiments, or a combination thereof. Moreover, this application may be in the form of a computer program product that is implemented on one or more computer-usable storage media (including, without limitation, magnetic disk storage, CD-ROM, flash, and optical storages) containing computer-usable program codes. Those program codes include instructions to make a computer apparatus execute full or partial embodiments of the methods described above.

The respective embodiments of the present application are described one by one, the same and similar parts of the embodiments are made by reference, and in each embodiment is emphasized the difference from other embodiments. Specifically, the system embodiments are described briefly due to similarity to the method embodiments, and relevant modules of the system embodiments are made with reference to the method embodiments.

The present application may be applied to many universal or dedicated computing system environments or configurations, for example, a personal computer, a server computer, a handset or a portable device, a flat-panel device, a multi-processor system, a microprocessor-based system, a set-top box, a programmable consumer electric device, a network PC, a minicomputer, a large-scale computer, a distributed computing system including any one of the above systems or devices, etc.

This application is described referring to the flow chart and/or block diagram of the method, system, and computer program product according to the embodiments of this application. It should be understood that each flow and/or block in the flow chart and/or block diagram, and the combination of flows and/or blocks in the flow chart and/or block diagram may be realized in computer program instruction. In fact, the entire application may be described in a general context of a computer executable instruction that is executed by a computer, for example, a program module. Generally, the program module includes routines, programs, objects, components, data structures, etc., for executing a specified task or implementing a specified abstract data type. Alternatively, the present invention may be implemented in a distributed computing environment, where a remote processing device connected through a communication network executes the task. In the distributed computing environment, the program module may be located in a local or remote computer storage medium which includes a storage device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An image processing method, comprising:
dividing a plurality of images into a plurality of groups wherein images in a same group share a same main color;
extracting a color feature vector (CFV) of each image in the plurality of groups;
subdividing images in each of the plurality of groups into a plurality of subgroups using a clustering technique according to distances between the CFVs of the images in the group, wherein subdividing the images into a plurality of subgroups comprises:
setting a first group of the plurality of groups as a current image group;
setting a main color of the images in the current image group as a root node of a subtree of an image signature tree, and setting the root node as a current parent node; and
performing recursive division of the images in the current image group, comprising:
dividing the CFVs of the images in the current image group into K subgroups, using the clustering technique according to distances between the CFVs of the images in the current image group, wherein K is an integer greater than 1;
setting a clustering center of the CFVs of a first subgroup of the K subgroups as a first child node of the current parent node, setting the first subgroup as the current image group, and setting the first child node as the current parent node in the event that the first subgroup does not meet a predetermined grouping stop condition; and
setting the images corresponding to the CFVs of a first subgroup of the K subgroups as the child nodes of the current parent node, and selecting the first subgroup as one of the plurality of subgroups comprising images which are obtained using the clustering technique according to the distances between the CFVs of the images in the event that the first subgroup meets the predetermined grouping stop condition;
searching, using one or more computer processors, among the plurality of subgroups for a result subgroup having a same main color as a main color of a given image and comprising an image whose CFV has a shortest distance from the CFV of the given image;
comparing the CFV of the given image with the CFVs in the result subgroup; and
identifying a near-duplicate image from the result subgroup that meets a preset near-duplicate image determining condition.

2. The method of claim 1, further comprising receiving the plurality of images to be grouped.

3. The method of claim 1, wherein extracting the color feature vectors of each image in the plurality of groups comprises:
dividing the each image into N blocks, wherein N is an integer greater than 1;
calculating a number of pixels corresponding to each of a predetermined number of colors for each of the N blocks; and
constructing a vector with the numbers of the pixels corresponding to the N blocks as the vector components.

4. The method of claim 1, wherein:
subdividing the images into a plurality of subgroups comprises: subdividing the images into a plurality of subgroups to establish an image signature tree; and
the plurality of images, the plurality of groups, and the image signature tree are stored in an image database.

5. The method of claim 1, wherein the given image is an image sent by a user via a network.

6. The method of claim 1, further comprising returning the near-duplicate image to a user.

7. The method of claim 1, wherein the predetermined grouping stop condition includes that a number of CFVs in a group is lower than a preset threshold.

8. The method of claim 1, wherein the predetermined grouping stop condition includes that distances between the CFVs in a group and the clustering center of the CFVs of the group are lower than a preset threshold.

9. The method of claim 1, wherein the predetermined grouping stop condition includes that a number of divisions performed for obtaining a group from a plurality of images exceeds a preset threshold.

10. An image processing method, comprising:
dividing a plurality of images into a plurality of groups wherein images in a same group share a same main color;
extracting a color feature vector (CFV) of each image in the plurality of groups; subdividing images in each of the plurality of groups into a plurality of subgroups using a clustering technique according to distances between the CFVs of the images in the group, wherein subdividing the images into a plurality of subgroups comprises: subdividing the images into a plurality of subgroups to establish an image signature tree;
searching, using one or more computer processors, among the plurality of subgroups for a result subgroup having a same main color as a main color of a given image and comprising an image whose CFV has a shortest distance from the CFV of the given image, wherein searching for a result subgroup comprises:
searching the image signature tree for a subtree whose root node is the main color of the given image, and setting the root node of this subtree as a current parent node; and
recursively searching the subtree, comprising:
searching the subtree for a first child node of the current parent node and determining whether a distance between the center of the CFVs of the first child node and the CFV of a given image meets a preset condition in the event that the first child node is an intermediate node;
setting the first child node which is an intermediate node as the current parent node in the event that the distance meets a preset condition;
stopping searching in the image signature tree in the event that the first child node is an intermediate node and the distance does not meet a preset condition; and
selecting the group in the first child node as a subgroup comprising a plurality of images whose main color is the same as that of the given image and whose CFVs have the shortest distance from that of the given image in the event that the child node is a leaf node;
comparing the CFV of the given image with the CFVs in the result subgroup; and
identifying a near-duplicate image from the result subgroup that meets a preset near-duplicate image determining condition.

11. A near-duplicate image searching system, comprising:
one or more processors coupled to an interface, configured to:
divide a plurality of images into a plurality of groups wherein images in a same group share a same main color;
extract a color feature vector (CFV) of each image in the plurality of groups;
subdivide images in each of the plurality of groups into a plurality of subgroups using a clustering technique according to distances between the CFVs of the images in the group, wherein subdividing the images into a plurality of subgroups comprises to:
set a first group of the plurality of groups as a current image group;
set a main color of the images in the current image group as a root node of a subtree of an image signature tree, and setting the root node as a current parent node; and
perform recursive division of the images in the current image group, comprising to:
divide the CFVs of the images in the current image group into K subgroups, using the clustering technique according to distances between the CFVs of the images in the current image group, wherein K is an integer greater than 1;
set a clustering center of the CFVs of a first subgroup of the K subgroups as a first child node of the current parent node, setting the first subgroup as the current image group, and setting the first child node as the current parent node in the event that the first subgroup does not meet a predetermined grouping condition; and
set the images corresponding to the CFVs of a first subgroup of the K subgroups as the child nodes of the current parent node, and selecting the first subgroup as one of the plurality of subgroups comprising images which are obtained using the clustering technique according to the distances between the CFVs of the images in the event that the first subgroup meets the predetermined grouping stop condition;
search among the plurality of subgroups for a result subgroup having a same main color as a main color of a given image and comprising an image whose CFV has a shortest distance from the CFV of the given image;
compare the CFV of the given image with the CFVs in the result subgroup; and
identify a near-duplicate image from the result subgroup that meets a preset near-duplicate image determining condition; and
one or more memories coupled to the one or more processors, configured to provide the processors with instruction.

12. A near-duplicate image searching system, comprising:
one or more processors coupled to an interface, configured to:
divide a plurality of images into a plurality of groups wherein images in a same group share a same main color;
extract a color feature vector (CFV) of each image in the plurality of groups;
subdivide images in each of the plurality of groups into a plurality of subgroups using a clustering technique according to distances between the CFVs of the images in the group, wherein subdividing the images into a plurality of subgroups comprises to: subdividing the images into a plurality of subgroups to establish an image signature tree;
search among the plurality of subgroups for a result subgroup having a same main color as a main color of a given image and comprising an image whose CFV has a shortest distance from the CFV of the given image, wherein searching for a result subgroup comprises to:
search the image signature tree for a subtree whose root node is the main color of the given image, and setting the root node of this subtree as a current parent node; and
recursively search the subtree, comprising to:
search the subtree for a first child node of the current parent node and determining whether a distance between the center of the CFVs of the first child node and the CFV of a given image meets a preset condition in the event that the first child node is an intermediate node;

set the first child node which is an intermediate node as the current parent node in the event that the distance meets a preset condition;

stop searching in the image signature tree in the event that the first child node is an intermediate node and the distance does not meet a preset condition; and select the group in the first child node as a subgroup comprising a plurality of images whose main color is the same as that of the given image and whose CFVs have the shortest distance from that of the given image in the event that the child node is a leaf node;

compare the CFV of the given image with the CFVs in the result subgroup; and identify a near-duplicate image from the result subgroup that meets a preset near-duplicate image determining condition; and one or more memories coupled to the one or more processors, configured to provide the processors with instruction.

13. A computer program product for searching for near-duplicate images, the computer program product being embodied in a tangible non-transitory computer readable storage medium and comprising computer instructions for:

dividing a plurality of images into a plurality of groups wherein images in a same group share a same main color;

extracting a color feature vector (CFV) of each image in the plurality of groups;

subdividing images in each of the plurality of groups into a plurality of subgroups using a clustering technique according to distances between the CFVs of the images in the group, wherein subdividing the images into a plurality of subgroups comprises:

setting a first group of the plurality of groups as a current image group;

setting a main color of the images in the current image group as a root node of a subtree of an image signature tree, and setting the root node as a current parent node; and performing recursive division of the images in the current image group, comprising:

dividing the CFVs of the images in the current image group into K subgroups, using the clustering technique according to distances between the CFVs of the images in the current image group, wherein K is an integer greater than 1;

set the clustering center of the CFVs of a first subgroup of the K subgroups as a first child node of the current parent node, setting the first subgroup as the current image group, and setting the first child node as the current parent node in the event that the first subgroup does not meet a predetermined grouping condition; and setting the images corresponding to the CFVs of a first subgroup of the K subgroups as the child nodes of the current parent node, and selecting the first subgroup as one of the plurality of subgroups comprising images which are obtained using the clustering technique according to the distances between the CFVs of the images in the event that the first subgroup meets the predetermined grouping stop condition;

searching among the plurality of subgroups for a result subgroup having a same main color as a main color of a given image and comprising an image whose CFV has a shortest distance from the CFV of the given image;

comparing the CFV of the given image with the CFVs in the result subgroup; and identifying a near-duplicate image from the result subgroup that meets a preset near-duplicate image determining condition.

14. A computer program product for searching for near-duplicate images, the computer program product being embodied in a tangible non-transitory computer readable storage medium and comprising computer instructions for:

dividing a plurality of images into a plurality of groups wherein images in a same group share a same main color;

extracting a color feature vector (CFV) of each image in the plurality of groups; subdividing images in each of the plurality of groups into a plurality of subgroups using a clustering technique according to distances between the CFVs of the images in the group, wherein subdividing the images into a plurality of subgroups comprises: subdividing the images into a plurality of subgroups to establish an image signature tree;

searching, using one or more computer processors, among the plurality of subgroups for a result subgroup having a same main color as a main color of a given image and comprising an image whose CFV has a shortest distance from the CFV of the given image, wherein searching for a result subgroup comprises:

searching the image signature tree for a subtree whose root node is the main color of the given image, and setting the root node of this subtree as a current parent node; and recursively searching the subtree, comprising:

searching the subtree for a first child node of the current parent node and determining whether a distance between the center of the CFVs of the first child node and the CFV of a given image meets a preset condition in the event that the first child node is an intermediate node;

setting the first child node which is an intermediate node as the current parent node in the event that the distance meets a preset condition;

stopping searching in the image signature tree in the event that the first child node is an intermediate node and the distance does not meet a preset condition; and selecting the group in the first child node as a subgroup comprising a plurality of images whose main color is the same as that of the given image and whose CFVs have the shortest distance from that of the given image in the event that the child node is a leaf node;

comparing the CFV of the given image with the CFVs in the result subgroup; and identifying a near-duplicate image from the result subgroup that meets a preset near-duplicate image determining condition.

* * * * *